Oct. 23, 1956  H. E. SCHULSE  2,767,846
CHEMICAL FEEDERS
Filed Oct. 2, 1952  3 Sheets-Sheet 1
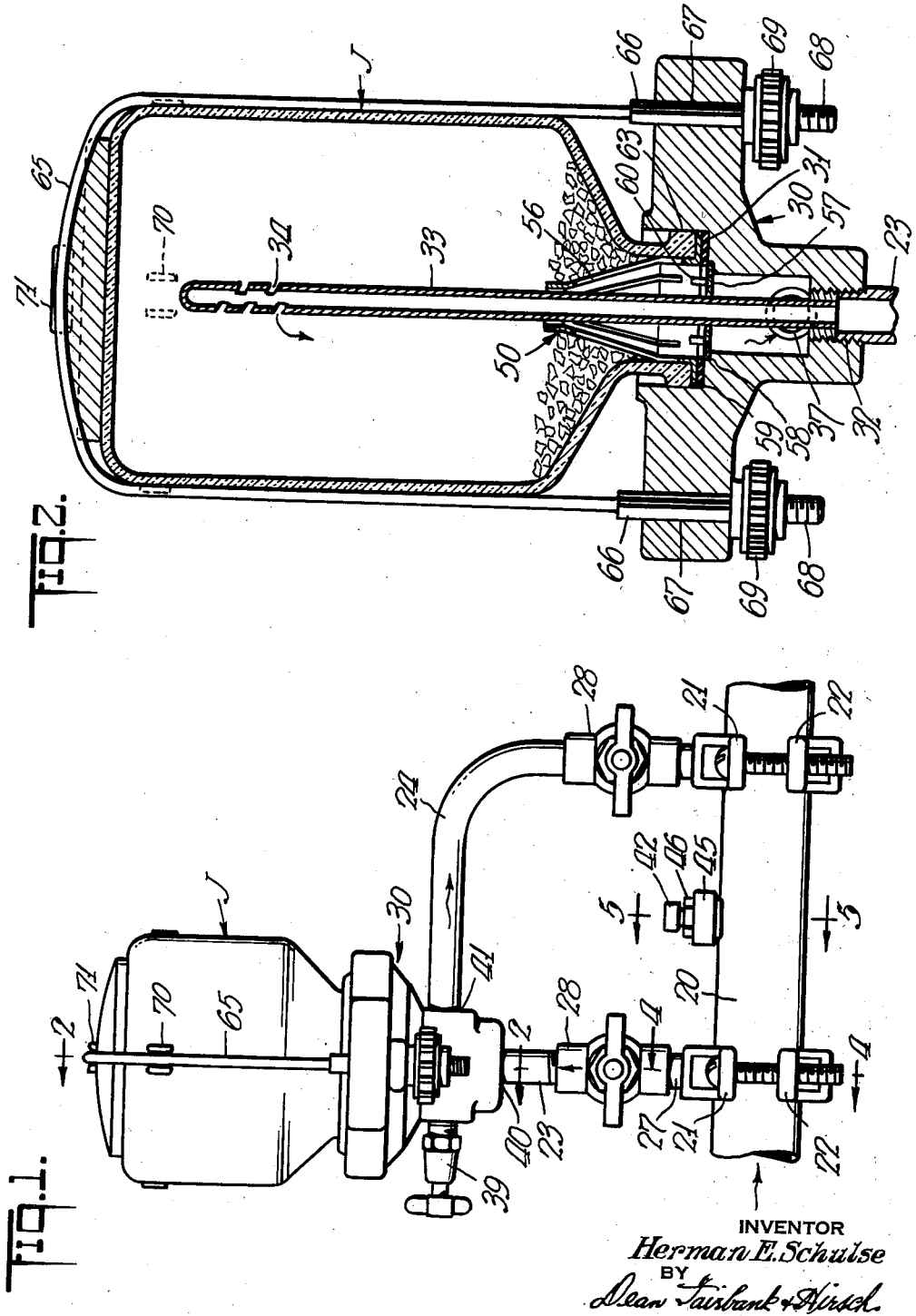
INVENTOR
Herman E. Schulse
BY
Dean Fairbank + Hirsch
ATTORNEYS Oct. 23, 1956 H. E. SCHULSE 2,767,846
CHEMICAL FEEDERS
Filed Oct. 2, 1952 3 Sheets-Sheet 2
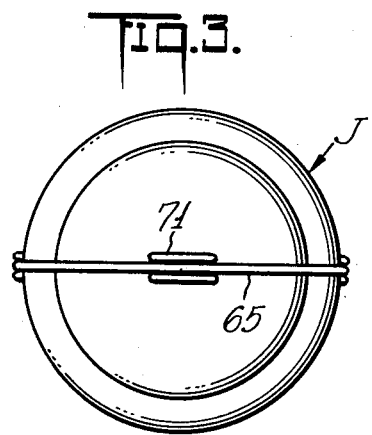
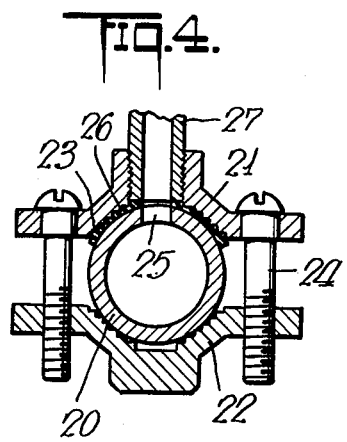
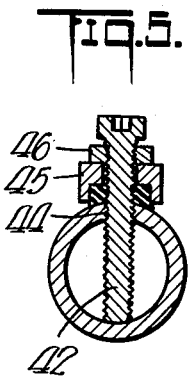
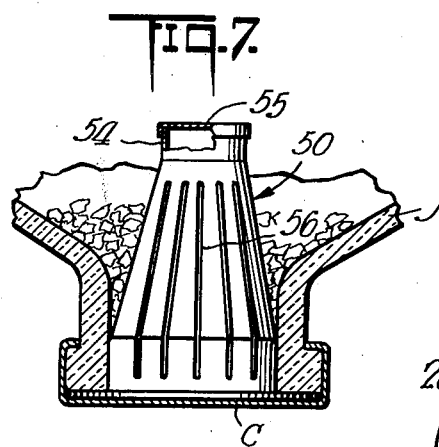
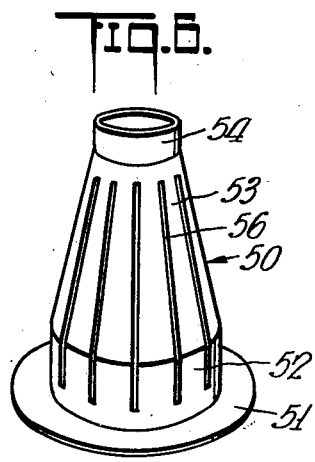
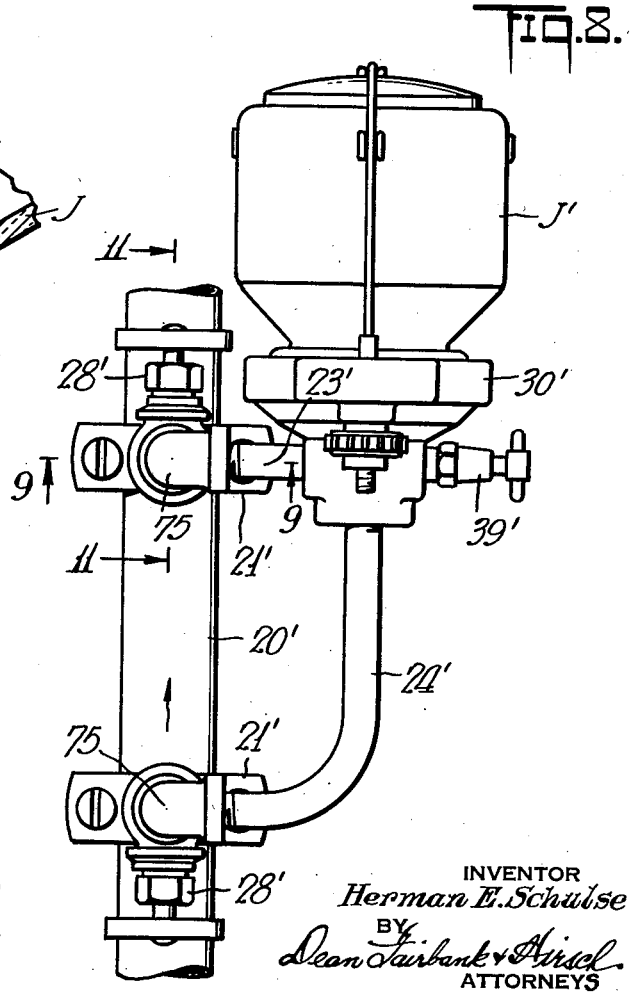
INVENTOR
Herman E. Schulse
BY
Dean Fairbank & Hirsch
ATTORNEYS

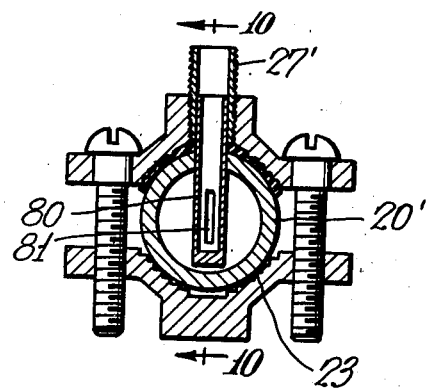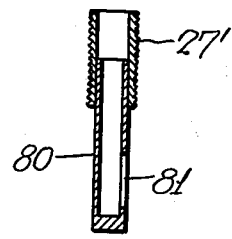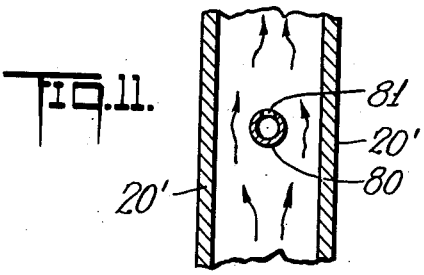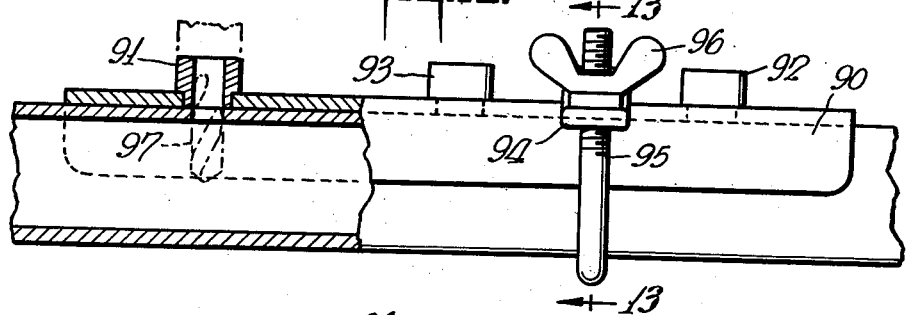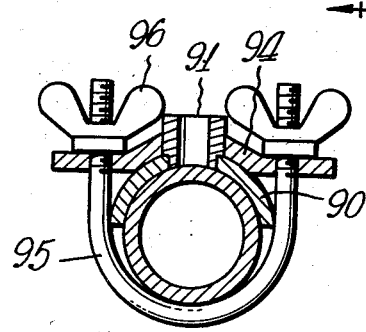

United States Patent Office 2,767,846
Patented Oct. 23, 1956

2,767,846

CHEMICAL FEEDERS

Herman E. Schulse, Bal Harbour, Fla.

Application October 2, 1952, Serial No. 312,756

7 Claims. (Cl. 210—36)

My present invention is concerned with chemical feeders and while of broader application, relates more especially to a feeder of the type that automatically introduces into water flowing through a pipe system, a small substantially predetermined proportion of chemical for any desired purpose.

Among important applications, the chemical feeder may serve more especially for use in private homes, larger dwelling houses, hospitals, schools and factories, to add a softener to a supply of hard water, to add a corrosion inhibitor, more especially to water flowing through metal piping systems, or as a fluoridator to add to water a minute proportion of fluoride for checking dental carries, or for performing any two or more of said functions or further functions in addition, or instead of one or more of those here illustratively enumerated.

One object of the invention is to provide a chemical feeder by which a substantially constant proportion of chemical is added to the water as it is discharged from the system, without resort to complicated adjustments, needle valves, drop pipes or the like.

Another object is to provide the chemical for the feeder within a sealed package that may be installed in the water supply line with the greatest of facility even by an unskilled person, with inherent assurance against improper installation, and without the slightest danger of loss of contained chemical, or injury to the person, were for instance undiluted toxic chemical such as sodium fluoride to engage or be ingested by the person.

It is among other objects to provide a chemical feeder accessory, more especially for a domestic water pipe line, which may be fabricated in the form of a kit for installation by the home owner or occupant without the expense of a plumber's services, yet with assurance that the bores in the water pipe to which this accessory is connected are properly positioned, and with assurance of efficacy of the accessory, whether such water pipe extends upright or horizontally, substantially against or spaced from the wall of the building.

Another object is to provide a system of the above type in which the proportional flow of water from a main pipe through a shunt passageway to pick up and add chemical in solution to the flowing water, is effected by connection only of the extremities of a shunt connection to the pipe system without the need for a third bore to accommodate an intermediate or median restriction fitting or valve.

According to one feature of the invention, two branch conduits preferably in the form of pipe lengths, are connected to the water pipe at a predetermined short distance from each other and said pipes at their ends are connected in communication with a receptor or base, the horizontal platform of which supports an inverted jar containing the chemical to be fed, a stand-pipe having water outlets therein rising from the receptor, preferably axially of the jar and being supplied from one of the branch conduits, the solution of chemical thus formed passing from the jar through the receptor for return to the water pipe by way of the companion conduit, appropriate flow control means in the water pipe establishing a difference of pressure potential between the branch conduits adequate to assure the required flow of water through the chemical to effect the desired solution.

Another feature is the use of a complete closed shipping package for containing the chemical in solid form, said package being a jar having an axial passageway therethrough, desirably sealed before installation, through which the stand-pipe that rises from the receptor protrudes upward into the jar when installed in place upon its receptor.

According to another feature, the chemical feeder includes a strainer for preventing the escape of undissolved chemical into the pipe system, said strainer being desirably releasably held in position upon the receptor between the jar and the receptor outlet.

In the accompanying drawings in which are shown one or more of various possible embodiments of the various features of the invention, Fig. 1 is an elevational view showing the installation of the feeder accessory upon a horizontal water pipe spaced from the building wall along which it extends, Fig. 2 is a view in longitudinal cross section taken on line 2—2 of Fig. 1, and on a larger scale, Fig. 3 is a top plan view of the installed jar, Fig. 4 is a transverse sectional view taken on line 4—4 of Fig. 1, Fig. 5 is a transverse cross sectional view taken on line 5—5 of Fig. 1, Fig. 6 is a perspective view of the stand-pipe guide of the package of chemical, Fig. 7 is a fragmentary cross sectional view of the jar with the stand-pipe guide of Fig. 6 assembled therein, in the sealed condition prior to the installation in the feeder, Fig. 8 is a view similar to Fig. 1 showing the installation on a vertical pipe that extends substantially in contact with a building wall.

Fig. 9 is a view in transverse cross section taken on line 9—9 of Fig. 8,

Fig. 10 is a longitudinal sectional detail taken on line 10—10 of Fig. 9,

Fig. 11 is a sectional view taken on line 11—11 of Fig. 8 showing the direction of water flow, Fig. 12 is a side elevational view showing the mode of drilling the holes into the water pipe to effect installation, and Fig. 13 is a sectional view taken on line 13—13 of Fig. 12.

Referring now to the drawings, there is shown in Fig. 1 a chemical feeder connected illustratively to a horizontal length of water pipe or main pipe 20, for shunt flow of water therefrom by branch conduits or pipes 23 and 24, which are connected to be mounted upon the water pipe 20, each by means of a pair of coacting clamp members 21, 22, desirably serrated as at 23a for gripping the pipe therebetween when tightened together by connecting screws or bolts 24a. The aperture 25 in pipe 20, for the corresponding shunt conduit, is encompassed by a gasket 26 to assure a leak-tight connection for nipple 27 protruding from clamp 21.

Preferably the conduit or pipe sections 23 and 24 are provided, each with a conventional cock section 28 by which it is possible to shut off or connect the water supply system to the chemical supply to be described hereinafter.

The branch conduit preferably comprises a shorter straight section 23 and a longer L-shaped section 24, both extending outward at right angles and in a common plane from pipe 20, so that the outer ends of said conduits 23 and 24 extend at right angles to each other for connection, respectively at the bottom 40 and side 41 of a shelf that mounts the container of chemical, said shelf being designated a "receptor" 30. The receptor has a horizontal platform 31 that accommodates the container J shown as an inverted jar with its mouth thereagainst. The receptor 30 and the jar of chemical therein have little weight and are adequately sustained by branch pipe lengths 23 and 24 without the need for further support. The receptor is shown in Fig. 2 with an axial aperture 32 therethrough that mounts a stand-pipe 33 securely affixed therein, coaxial therewith, and which extends upward into the jar J for delivery of water from branch pipe 23, through a series of elongated apertures 34 near the upper closed end of such stand-pipe, slowly to dissolve the chemical for discharge of solution from the jar. The solid chemical rests upon an insert 50 in the neck of the jar, and the solution escapes through slots 56 laterally through port 37 in the receptor, back by way of branch pipe 24 to the main pipe 20. The receptor also has a lateral outlet cock 39 through which jar J may be drained of liquid after cocks 28 have been closed preparatory to replacement of a spent jar of chemical.

In the embodiment of Fig. 1, the pressure differential between the ends of the shunt connections 23, 24 to and from the chemical is effected by a transverse plug 42 (Fig. 5), illustratively threaded into nut 45 and affixed in a hole 44 within the pipe and securely retained in any adjusted position in contact with or free from contact with the bore of the pipe at its free end by means of a lock nut 46.

The chemical package jar is preferably of translucent material such as glass or plastic of the type that will withstand the chemical action of the solution formed therein.

The mouth of the jar which is charged with solid chemical has a closure C which is to be removed prior to installation in the system. That closure may be similar to a milk bottle cap of paper stock, desirably with an aluminum foil coating.

The jar also includes an open insert 50, preferably of plastic, desirably cemented into the neck of the jar at its cylindrical wall portion 52. The insert desirably has an outstanding flange 51 against the rim of the jar and a converging wall portion 53 extending into the jar, terminates in a cylindrical end 54, closed by a cap 55, desirably of water soluble material such as gelatin. The length of the insert 50 is slotted at 56 from near the bottom adjacent flange 51 to near the cylindrical end 54.

Inasmuch as a screw mount of the jar to the receptor is undesirable by reason of its tendency to jam or to cause breakage or undue strain upon the parts in manipulation for replacement, it is preferred simply to set the mouth of the jar freely in a smooth walled depression or socket 63 in the receptor 30 to rest upon a suitable gasket 59 of resilient material upon platform 31.

Desirably a strainer 57 is incorporated in the unit to intercept foreign particles or undissolved chemical that might otherwise pass into the water stream. While that strainer might be incorporated in the jar, as for instance near the mouth end of the insert 50, it is preferred to lodge that strainer 57 in a depression 58 in the base of the receptor 30. That strainer is peripherally overlapped by the inner rim of gasket 59 resting on the receptor base immediately above the strainer 57, and preferably cemented in place and supporting the inverted jar J by engagement of the flange 51 therewith.

To retain the container or jar in place upon the receptor, a clamp is provided therefor, desirably in the form of a stainless steel cable 65, which extends the height of the jar along opposite sides thereof, that are connected by a transverse length of cable diametrically across the end of the jar. The cable has a square ended ferrule or tip 66 on each extremity thereof, each extending through a corresponding passageway 67 through the rim of the receptor, the extremities of said ferrule being threaded at 68 to accommodate corresponding cable nuts 69 clamping against the lower face of the receptor. Desirably the jar is molded with two or more pairs of opposed teats 70, between which the cable is retained against inadvertent or undesired displacement, while the closed end of the jar which is uppermost, has a pair of upstanding ridges 71 between which the median portion of the cable extends. In this manner the stainless steel cable may tightly press the jar against the receptor without torsional twisting or breaking strain and with assurance of a hermetic seal at the gasket joint 59 between the receptor and the mouth of the container.

The operation will be readily understandable from the foregoing description but may be briefly summarized as follows:

With the system in use, any flow of water through the pipe 20, as for instance by opening one or more faucets in the domestic line, results in a substantial pressure head between branch pipe 23 and branch pipe 24 due to the restriction imposed upon the water flow therebetween by reason of the plug 42 therebetween, transversely of the pipe. As a consequence, a small portion of the water will flow upward through pipe 23 axially through port 32 into the receptor 30 and thence upward through stand-pipe 33 to emerge through openings 34, through the solid chemical for solution to trickle downward through slots 56 in insert 50 and thence through strainer 57, through the port 37 of receptor 30 and L-shaped pipe 24, back to the main pipe 20.

By proportioning the restriction such as to cause but a small portion of the main water flow to pass through the jar J, the solution returning from the chemical container to the main pipe will, after mixing with the main water supply, be highly diluted in accordance with requirements, to a strength if desired, of as little as of the order of one-half part per million or less.

In Fig. 8 is illustratively shown an embodiment in which the feeder, unlike that of Fig. 1, is mounted on a vertical water pipe 20′ and in which the proportioning resistance to assure pressure head between the inlet and outlet fittings is contrived without the need for boring a third hole in the water pipe mounting the feeder, as is necessary in the embodiment of Fig. 1.

It will be seen that in the vertical pipe embodiment of Fig. 8, the identical shunt pipe sections 23′ and 24′ are used as in the embodiment of Fig. 1, except that the L-shaped section 24′ is screwed axially into the base of the receptor 30′, while the straight section 23′ is screwed into the side of the receptor, thereby effecting mount of the receptor in the required horizontal relation.

Moreover, in the embodiment of Fig. 8, an elbow pipe fitting section 75 extends outward from each of the pipe clamps 21′ in order to dispose the straight and elbow branch pipe sections 23′ and 24′ at a sufficient distance in front of the pipe 20′ to afford room for the receptor 30′ and the jar J′, even where the water pipe 20′, unlike that of Fig. 1, extends along or closely contiguous to the building wall.

Another difference between the embodiments of Figs. 1 and 8 is in the proportioning arrangement which will now be described. In the embodiment shown in Fig. 8, the clamp 21′ at the down-stream side of pipe 20 has affixed in the nipple pipe end 27′ thereof, a hollow open cartridge element 80 which may, as shown, extend completely and diametrically across the bore of the water pipe 20′. That cartridge desirably has one or more apertures therein illustratively, an elongated slot 81 disposed at the downward stream side, as shown in Fig. 11. While the slot 81 may be of any of a wide variety of areas depending on the performance desired, it is ordinarily preferred to provide such slot of area substantially equal to that of the bore of stand-pipe 33.

As will be seen from the drawings, as water passes through the pipe 20′, its streamline flow around the cartridge 80 effects an ejector or suction action at the slot 81 to draw water therethrough by suction from the corresponding branch or pipe conduit 23', thus affording the required differential of pressure, without the need for a third hole in the water pipe, as is required in Fig. 1.

It will of course be understood that the proportioning system shown in Fig. 1 with its third restriction fitting that mounts restriction plug 42, or that shown in Fig. 8, with its aspirating cartridge 80 in the outlet pipe mount may be interchangeably used in the embodiments of Figs. 1 and 8.

It is of course also understood that the direction of flow of water in each of the embodiments may be the reverse of that shown, with the proviso, however that when the pressure differential is effected by cartridge 80, its openings or slot 81 should be directed down-stream to assure the desired aspirating action.

It is desirable to market the feeder, especially where it is to be used in the small home, in the form of a kit, for ease of installation by the unskilled home owner or occupant, without the need or expense of the services of a plumber.

To this end the kit would include in addition to the various elements previously described, a steel template 90 having rising therefrom bushings 91, 92, determining the location of the pipe bores and clamps for the embodiment of Fig. 8, and in the case of the embodiment of Fig. 1, a median bushing 93 as well, for the hole to accommodate the restriction plug 42. This template has an associated clamp plate 94, wire bail 95 and wing nuts 96, securely yet removably to clamp it to the water pipe at the region where the installation is to be made. The kit would also include a short drill which would be applied through the respective bushings, as suggested in dotted lines at 97 in Fig. 12, for boring the required holes (two or three as required), with the assurance that the drill does not pass clear through the opposite side of the pipe.

The template 90 is then removed and the installation may be made in manner quite obvious from the previous description, regardless whether the water pipe length to which the accessory is to be connected, extends vertically or horizontally, contiguous to or spaced from the building wall.

While one of the accessories described is sufficient for the home, even though the jar J contains but a pint of solid chemical and need not be replaced more frequently than monthly, it will be understood that larger installations could be employed for larger buildings, or that a plurality of the smaller units could be applied at each of various places in a larger building.

As above indicated, the invention is in no wise limited to any particular chemical or combination of chemicals to be fed to the system. For rust prevention the container or jar might contain sodium silicate or preferably sodium hexametaphosphate, the latter in the form of a relatively insoluble glass which will be picked up by the water stream in the dilute solution required. For fluoridation it is desired to use a composition that will release the fluoride in highly dilute solution only, so that the dissolved chemical fed back into the main water stream will have dilution in the order of well under one part per million. This result may be accomplished by incorporating the sodium fluoride in a slightly water-soluble glass such as the hexametaphosphate above mentioned, so that the chemical will thus perform both corrosion inhibition and fluoridation.

Once the system is installed, it requires no attention other than to replace the chemical when inspection of the transparent jar J indicates exhaustion.

The package being completely sealed, neither contamination nor loss of contained chemical is likely, nor is injury likely to the person handling the same, due to possible escape of toxic substance such as sodium fluoride. To replace a jar, all that is necessary is to shut off valves 28, and to drain water from the jar J to be replaced by opening valve 39 in the receptor. Thereupon the cable nuts 69 are loosened sufficiently to permit raising and removal of the empty jar, after pushing the cable 65 aside. If desired, strainer 57 may be manually removed by its rising finger posts 60 for cleaning and then snapped under the rim of gasket 59. After removal of closure C from the fresh package, that package is inverted and passed over the free end of the stand-pipe 33 and pushed downward, thereby penetrating or displacing the seal 55 across the inner end of guide 50 until the jar rests upon its gasket 59. The end 54 of the insert 50 encompasses stand-pipe 33 with little clearance and so serves as a guide. Thereupon the cable 65 is replaced between ridges 71 and the cable nuts 69 are retightened so that upon closing valve 39, and re-opening valves 28, the system is again in service.

As many changes could be made in the above construction, and many apparently widely different embodiments of this invention could be made without departing from the scope of the claims, it is intended that all matter contained in the above description or shown in the accompanying drawings, shall be interpreted as illustrative and not in a limiting sense.

Having thus described my invention, what I claim as new and desire to secure by Letters Patent of the United States is:

1. A re-fill package for a chemical feeder, comprising a jar containing the chemical and having an open insert extending thereinto, said open insert affording a restricted portion serving as a guide for accommodating when installed, a feeder stand-pipe, said insert having passageways through the wall thereof for distribution therefrom when installed, of liquid that has passed through the chemical by way of said stand-pipe, and means closing said open insert prior to installation of the package for use.

2. The combination recited in claim 1 in which the insert has an outstanding flange over the rim of the jar, snugly fits the neck of the jar near its rim, converges inward toward the restricted portion which latter constitutes a cylindrical guide for the stand-pipe, and in which the passageways through the wall of the insert are longitudinal slots.

3. The combination recited in claim 1 in which the open insert has a closure at its inner end adapted to be displaced by application of the jar over the stand-pipe and in which the closure of the package is a cap over the neck of the jar.

4. In a chemical feeder system of the type that has a replaceable chemical jar; the combination of a receptor for accommodating the inverted mouth of said jar, said receptor having a stand-pipe with openings therein for discharge of water into the chemical, an annular gasket affixed to the floor of said receptor and serving as a seat for the rim of the jar, and a removable strainer annulus seated in said receptor with the inner rim of said gasket overlapping its outer rim, the central opening of said strainer serving as a passageway for the stand-pipe.

5. In a chemical feeder system of the type that has a replaceable chemical jar; the combination of a receptor for accommodating the inverted mouth of said jar, said receptor having a stand-pipe with openings therein for discharge of water into the chemical, and means removably securing the jar to the receptor, said means comprising a cable extending over the closed end of the jar with its ends protruding through the receptor and having nuts threaded upon said ends to clamp the jar in position.

6. In a chemical feder system of the type that has a replaceable chemical jar, the combination of a receptor for accommodating the inverted mouth of said jar, said receptor having a stand-pipe with openings therein for discharge of water into the chemical, and means removably securing the jar to the receptor, said means comprising a cable extending over the end of the jar with non-circular tips protruding through corresponding openings in the receptor and nuts upon the ends of said tips to clamp the jar in position, said jar having pairs of teats thereon to accommodate the cable therebetween.

7. The combination recited in claim 6, in which the closed end of the jar has a pair of adjacent ridges to confine the cable therebetween.

References Cited in the file of this patent

UNITED STATES PATENTS

| | | |
|---|---|---|
| 452,172 | West | May 12, 1891 |
| 461,235 | Butler | Oct. 13, 1891 |
| 588,418 | Gaynor | Aug. 17, 1897 |
| 795,366 | Parker | July 25, 1905 |
| 842,088 | Elfreth | Jan. 22, 1907 |
| 846,100 | Estep | Mar. 5, 1907 |
| 1,058,113 | Stuckel | Apr. 8, 1913 |
| 1,370,687 | Ferris | Mar. 8, 1921 |
| 1,400,107 | Van Meter | Dec. 13, 1921 |
| 1,964,576 | Horne | June 26, 1934 |
| 2,058,901 | McPherson | Oct. 27, 1936 |
| 2,113,203 | Straubel | Apr. 5, 1938 |
| 2,137,755 | Glynn | Nov. 22, 1938 |
| 2,582,505 | Reynolds | Jan. 15, 1952 |
| 2,628,129 | Hosmer et al. | Feb. 10, 1953 |

FOREIGN PATENTS

| | | |
|---|---|---|
| 57,265 | Germany | Oct. 23, 1890 |